July 11, 1967 A. E. BERGQUIST 3,330,285
FILTERING MATERIAL AND PROCESS
Filed July 14, 1964
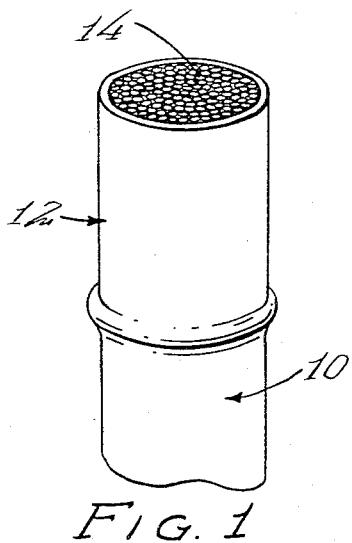
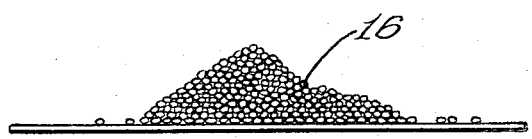
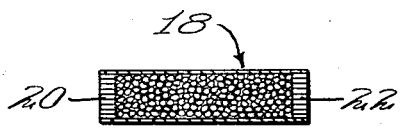
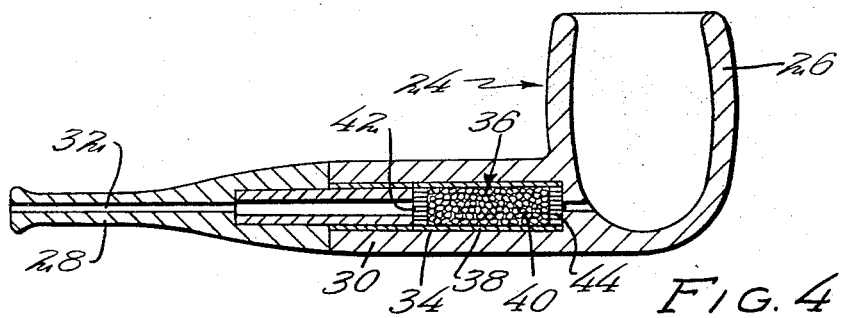
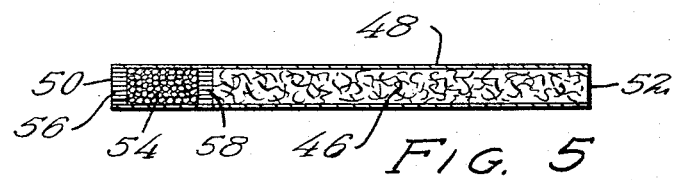
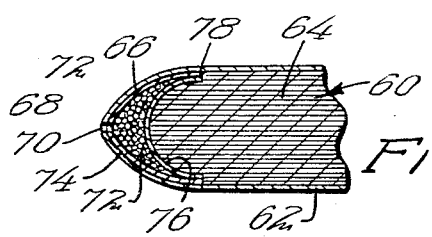
INVENTOR
ARTHUR E. BERGQUIST
BY
ATTORNEY

United States Patent Office 3,330,285
Patented July 11, 1967

3,330,285
FILTERING MATERIAL AND PROCESS
Arthur E. Bergquist, Lindstrom, Minn. 56045
Filed July 14, 1964, Ser. No. 382,555
8 Claims. (Cl. 131—10.7)

This application relates to a filtering material produced from stalks of corn and to the process for utilizing and preparing the filter material for use from corn stalks.

Throughout the year I have expended considerable effort in attempting to arrive at a filtering material which would be usable for filtering tobacco smoke, automobile fumes, and the like, but which would be relatively inexpensive and available in the quantities which would be required. As is well known many different types of filtering materials have been developed for various purposes. Quite commonly fibres are used as a means of filtering tobacco smoke whether of cigars, cigarettes, and/or pipe tobacco. In some instances, these filter materials were able to produce some effect in the removal of harmful products of the combustion of the tobacco. However, these filtering materials when used in combination with cigarettes have proven to be rather unsatisfactory in some respects. To combat or extend the efficiency of the filtering material, in the usage of many manufacturers, activated charcoal has been added as an additional ingredient. However, my tests show that in spite of the intensive filtration to which tobacco smoke, and particularly cigarettes, is subjected that upon filtering the same smoke through the filtering material which I have developed, that an intensive discoloration of my filtering material is produced. In most instances, my normally white filtering material is changed from its normal white color to a deep brown or even a brownish black. The efficacy of my filtering material may be shown in that when the procedure is reversed, smoke which passes through my filtering material will produce practically no discoloration at all upon the filtering material now being used in cigarettes for example.

It is accordingly an object of the present invention to provide a filtering material which will remove the undesirable ingredients from tobacco smoke, but which will still enable the user of tobacco to enjoy himself while smoking.

It is a further object of the present invention to provide a filter material which may be used in cigarettes of the conventional type having filters, my filtering material being used in lieu of the filtering materials now presently used in cigarettes.

It is a further object of the present invention to provide a filtering material which is adapted to be used not only in cigarettes, but in cigars and pipes as well as a filtering material.

As is generally known, the segments of a corn stalk have a hard outer coating which when removed exposes a white pulp in which the pores of the pulp extend longitudinally. When a section of this pulp is shredded transversely to the direction in which the cells extend, a filtering material is produced which is highly superior for its intended usage to anything available. Obviously, the size of the granules of corn filtering material may be controlled and be of any particularly desired size. When these filtering granules of corn are inserted into a cigarette tip, cigar tip, or pipe filter, the granules enable the smoke to pass through them not only because of the air spaces between adjoining granules, but because of the longitudinal air passes in the granular corn filtering material as well. I have found that the granular corn filtering material may be placed in the filter tip end of a cigarette in place of the presently used filter and do a job far greater in efficiency than any now in use of which I am aware. Additionally, the cost of a filtering material of corn is relatively inexpensive so that the filtering material could readily be produced in great quantity for its intended usage. It will be understood that the means of packing commercially corn filtering material into a cigarette are now available. In addition, I have found that my corn filtering material may be attached to a backing member such as a paper material and then rolled to a desired diameter for usage as a cigar filter. Additionally, I have found that my filtering material is adapted to be secured within the end of the tip of a cigar so as to provide a filtering material for cigars as well. Previously, as will be recognized, this was not too likely an occurrence.

It is an object of the present invention to provide a filtering material which is neat and clean to handle, inexpensive to produce, and readily adapted to be used in a variety of filtering situations where smokes and other gases including tars are to be found.

It is a further object of the present invention to provide a filtering material which is adapted to be used in a filter for use in removing undesirable elements from the gases exhausted from motor vehicles in either the location of the exhaust or connection with it at some convenient point where the fumes from within the engine may be passed. I have found that a filter containing my filtering material inserted between the point of discharge of oil fumes will greatly trap undesirable ingredients being discharged. In view of the efficiency of my filtering material, it is quite conceivable that a multiplicity of filters might be used in connection with both the exhaust system and the engine of motor vehicles to greatly enhance the filtration of the products of combustion and partial combustion.

It is an object of the present invention to produce a filtering material from the stalks of corn which will be highly absorbent to the products found in smoke and which may be produced in extensive quantities and at a relatively low cost.

It is a further object of the present invention to provide a filtering material in granular form which may be placed in conventional filters to filter the smoke from cigarettes and other tobacco products, and which may be used in exhaust and fume filtering devices for motor vehicles and the like. It is a further object of the present invention to provide the above advantages at minute cost.

Again in connection with the filtering ability of the product of my invention, an extensive series of tests was set up wherein the known variety of cigarettes of United States, together with a large variety of cigarettes sold in Canada were subjected to a process of filtration in which the cigarettes were tested in at least two different ways. A machine was utilized which would provide a controlled amount of suction so that the cigarettes would be smoked uniformly. The cigarettes were first smoked using a filtering material as the cigarettes were sold. Next, an additional filter was added to the cigarette containing my filtering material. It was found that my filtering material became deep brown and ranging to almost a black from the products removed from the smoke in filtering. It is to be particularly noted that this occurred after the smoke had passed through the original filter in the cigarette. The second series of tests was run in which the conventional cigarette filter was replaced by my filtering material, and in this instance no apparent difficulty was produced in the filtration of smoke through my filtering product. A third test required the use of my filtering material as a filter for the cigarette with a cigarette filter of the particular brand being used as a second filter. In this instance, it was discovered that while my filtering material became deep brown to a black in color, the cigarette filter remained practically undiscolored at all. It is accordingly apparent that my filtering material is extremely functional.

I further found that my granular filtering material was adapted to be placed on a coated material and rolled into a cylinder so that it could be used as a pipe filter with the same effects as produced in the filtration of cigarette smoke.

It is an object of the present invention to provide a filtering material adapted to be used in the multiplicity of fume or smoke situation disclosed, and adapted to be held in a variety of shaped containers, without losing its efficiency.

These and other objects and particular advantages will be more particularly described and detailed in the accompanying specification taken in conjunction with the drawings herein which:

FIGURE 1 is a view in elevation of a portion of a corn stalk showing the pith cells of the inner stalk lying lengthwise.

FIGURE 2 is a view in elevation of a small mound of granulated filtering material adapted to be used in any desired filter.

FIGURE 3 is a cross section through a cartridge filter such as would be adapted for use in a cigarette in which the granulated corn filtering material is held within the cartridge by fibre pads at the end of the cartridge.

FIGURE 4 is a cross section taken through a pipe illustrating a pipe filter usage of my filter material.

FIGURE 5 is a cross section taken through a cigarette having a filter tip of my corn filter material.

FIGURE 6 is a cross section taken through the end of a roll of tobacco such as a cigar having an overwrap such as tobacco leaf in which the granular filtering material is retained in a recess between the end of the overwrap and the roll of tobacco and in which a modified cup retainer is used to hold the granules in the desired location.

I provide a granulated material of corn stalk pith particularly adapted for use as a filter material for gaseous fumes, smoke, dust and the like. As may be seen in FIGURE 1, corn stalks are generally sectional. The corn stalk generally numbered 10 in FIGURE 1 is comprised of an outer portion 12 which encloses a pith portion 14 in which the grain of the pith extends longitudinally.

The outer shell or cover 12 of the stalk 10 is removed in any desirable manner to expose the pitch 14 for purposes of granulation. The cells of the pith portion 14 are so arranged that air will pass longitudinally through the pith portion rather readily, but will not readily pass transversely through the pith.

I have found that when the pith is granulated across the grain, the pith granules 16 such as are illustrated in FIGURE 2 are produced which will readily permit passage of air through and between the granules while at the same time filtering the air if the granules 16 are confined in a filter container such as the cartridge generally numbered 18 shown in FIGURE 3.

I have found that when smoke, fumes, dust and the like contained in air are passed through a conveyor tube such as a cartridge, or any other suitable duct, that the granules of corn stalk pith remove undesirable elements of smoke, dust and the like from the air as they pass through the filter material.

It is to be understood, of course, that the granules 16 may be different sizes depending upon the filtering restriction which it is desired to pose. Passage of air through a filter containing corn stalk granules may be restricted by the density with which the granules are packed in the filter tube, by the size of the granules, and by the use of barricading elements such as the fibrous wads 20 and 22 at opposed ends of the cartridge 18 shown in FIGURE 3. It will be obvious and apparent that any desired composition may be used for the wads or pads such as plant fibers, metallic fibers, corn stalk pith plugs, and the like depending upon the desired filtration, cost elements, etc.

My invention is directed toward the process of producing filter granules of corn stalk pith and their usage as a part of a filter element, and combinations relating thereto, and in view of the known varieties of filter shells of various kinds and shapes to which my filter material is adapted, it is not believed necessary to provide a detailed explanation of these shell containers.

Returning to FIGURE 1, I have found that the granules of pith produced by granulating the pith across the grain may be produced in a variety of generally uniform sizes. Various mechanical granulators are available commercially to produce the desired results.

The individual granules 16 possess unusual characteristics which make them particularly suitable as a filter component in that they are quite light, highly adsorbent, and absorbent, tend to hold position without compacting, are long lasting, extremely economical to produce, and very easy to use with machines presently available for filling the filter containers.

For purposes of illustration, tests have been made using a filter of corn stalk granules for every brand of cigarettes available through retail channels. In these tests a machine capable of simulating repeated puffs of smoke similar to that of a person smoking a cigarette were made upon the various cigarettes and comparison was made visually and by means of a microscope to determine the effects upon filter materials in the following manner:

First, the filter of the cigarette (if it had one) was examined to determine the extent of the discoloration produced in smoking the cigarette.

Secondly, the filter of corn stalk pith granules was used and a similar visual determination made.

Thirdly, the combination of the filter of the cigarette disposed inwardly between the tobacco and the corn stalk pith granule filter was examined after the particular cigarette was smoked.

Fourth, the combination of the corn stalk pith granule filter disposed inwardly between the tobacco and the regular filter of the cigarette after the smoking of the cigarette was examined.

The normal natural color of the corn stalk pith granules ranges between white and what might be termed an off-white. In the first example, the end of the cigarette filter adjacent the tobacco turned brown while the other end of the filter ranged between no discoloration to a very light brown.

The filter comprising corn stalk granules turned two colors ranging between a blackish brown to a black at the end adjacent the tobacco and to a deep brown or medium brown at the intermediate point of the filter and gradually lightening in color until at the end of the filter granules practically no discoloration was evident.

The tests were conducted to permit as close to uniform amounts of smoke to be drawn through the various filters as mechanically possible with the filter materials being in corresponding compactness.

In the third type of test, it was found that the regular cigarette filter did not remove the so-called "tars" in that the corn stalk pith granule filter became deeply discolored at the end adjacent the regular filter, the discoloration ranging from a deep brown to in a few instances practically a blackish brown.

On the other hand, in the fourth test, it was observed that the regular cigarette filter placed outwardly of the corn stalk granule filter did not become discolored which was indicative that the corn stalk granule filter was extremely efficient.

The various tests which have been conducted and their results have been disclosed, and it is believed that the efficacy of the corn stalk granule filter for the removal of various elements from tobacco smoke is clearly shown. Similar tests of the efficiency of the filter materials in relation to dust produced similar high efficiencies, and the ability of the material to retain a high filtering capacity in extended usage was excellent.

It was further found that the granules of corn stalk pith were highly absorbent relative to moisture, and consequently performed exceedingly well as a filter for pipes and in the ends of cigars.

FIGURE 4 discloses a pipe generally numbered 24 having a bowl end 26, a bit 28, and an intermediate stem portion 30 between the bit and bowl. As will be understood a central aperture generally numbered 32 extends from the bit to the bowl through which smoke is drawn to the mouth of the smoker. An enlarged recess 34 is provided in the stem of the pipe in which a relatively elongated filter cartridge 36 is shown, the cartridge 36 being disposed in relation to the aperture 32 so as to require smoke coming from the bowl to pass through the filter before going through the bit into the mouth of the smoker.

The filter cartridge 36 may be comprised of an outer shell 38 of any desired materials such as paper. Within the overwrap 38 is enclosed granules 40 of corn stalk pith, the granules being retained within the ends of the cartridge 36 by barricading elements 42 and 44 which are permeable to the smoke coming from the bowl 36. The barricading elements have at least a central aperture through which smoke can pass. I have found that barrier elements may be comprised of fibrous pads, cup elements having central apertures extending through them, or by simply crimping the ends of the filter cartridge.

As may be seen in FIGURE 5, the granulated corn stalk pith filter may be integral with the tobacco roll 46 of cigarette tobacco enclosed within a cylinder 48 of paper and which has ends 50 and 52, the roll of tobacco extending from the end 52 throughout a major portion of the tubular container.

The granulated filter material is placed adjacent to the roll of tobacco 46, the granulated filter material being numbered 54. The granulated material 54 is held within the cigarette tube 48 by a barrier 56 such as previously described. A similar barrier 58 may be provided intermediate the granules 54 and the roll of tobacco 46 if desired, or it would be obvious to use any other material such as menthol for example, to provide a particular taste, or a material to remove a particular taste. As this interposition of materials between the filter and the tobacco is commonly known, it is not believed necessary to further amplify the description.

It will be understood that the filtering material in granular form may vary in size in the different filters, but the effect is generally the same. Accordingly, the numbers of the filter element have been changed in the various figures, but it is the understanding that except for the differences in size that the granules are similar, and the differences in numbers are provided because of the differences in the containers and usages of the particular filter elements.

FIGURE 6 illustrates the end of a cigar which may be generally numbered 60. The cigar may be rather loosely termed to be a roll of tobacco enclosed within an overwrapping generally of tobacco leaf. I have found that by providing an overwrap 62 at least of a length corresponding to the roll of tobacco 64 and preferably of a slightly greater length, that a recess 66 may be provided between the end of the overwrap 68 and the roll of tobacco 64. A central aperture 70 is provided in the end of the cigar through which smoke drawn through the roll 64 of tobacco and the filter material 72 may pass into the mouth of the smoker. The granular filter material 72 is held within the recess 66 by a pair of concave cups 74 and 76 which are joined along their peripheries as indicated at 78, the intermediate portion of the cups being spaced from one another to provide space for the granules 72 between them. The cup member may be imperforate except for the central aperture extending through them and the granular material, but preferably the outer cup 74 is imperforate except for the aperture 70 which extends through the end of the overwrap while the inner cup 76 is perforate or at least smoke permeable. By providing the outer cup, it is possible to prevent excessive wetting of the granular material from the saliva of the smoker, and further to prevent undesirable crushing and compacting of the granular material.

Returning to the cartridge 18 shown in FIGURE 3, it will be understood that the shape of the cartridge may be cylindrical, rectangular, or any other desired shape, and accordingly I desire to have it understood that usage of my material is not limited to a cylindrical container. For example, I have provided a generally square or rectangular filter element containing the granular particles for the removal of dust passing through a ventilator shaft. On the other hand, disks of granular particles have been employed in relation to fumes passing through exhaust and breather tubes from an automobile engine without limiting the effectiveness of the filter. In other words, the shape of the container is of importance only in that certain containers are more readily utilized in certain structures than containers of a different shape.

In the process of producing the granulated pith particles, the stocks of corn are cut after the ears have been removed by a picker, the lower portion of the stock normally being allowed to remain in the field. What might be termed the intermediate portion of the corn stalk is stripped of its outer covering to yield the pitch which is to be granulated. As has been previously mentioned, the relatively elongated pith portions are granulated across the grain preferably to provide particles which are capable of permitting the passage of air through themselves. Depending upon the filtering purpose to be accomplished, the particles are granulated to a particular size.

As an additional illustration of the effectiveness of the filtering material, tests were conducted on brands of cigarettes available to the retail trade. I found that my filter absorbed the oils, nicotine, or tars as they are more commonly known to such an extent that if the smoke from three cigarettes was passed through the same filter, the amount of entrapped tars in the filter was so great that squeezing of the filter would cause drops of the tars to be emitted. In other words, the filter material of my invention is so effective that it will readily filter the undesirable materials from the smoke of at least three cigarettes.

Similar results were obtained when the smoke of three or more filter cigarettes of the usual retail brands was passed through a single cigarette filter of my invention.

In accordance with the patent statutes, I have described the principles of construction and operation of my improvement in "Filtering Material and Process" have been described, and while an endeavor has been made to set forth the best embodiment thereof, it should be understood that changes may be made within the scope of the following claims without departing from the spirit of the invention.

I claim:

1. A filter element for use in combination with a burnably consumable roll of tobacco comprising:
   (a) a roll of tobacco of generally cylindrical outline having an outer wrap at least coextensive with said roll,
   (b) said outer wrap defining a recess between an end of said roll and said outer wrap,
   (c) granules of corn stalk pith having their natural longitudinal passages extending transversely to the direction of granulation of said pitch disposed in said recess comprising a smoke filter, and
   (d) means retaining said granules in said recess.

2. The structure of claim 1 and in which said retaining means includes a barrier element having at least a central aperture through which smoke can pass.

3. The structure of claim 1 and in which said outer wrap is tobacco leaf.

4. A filter element for use in filtering gaseous combustion products comprising:
   (a) a hollow body having open ends,
   (b) granulated corn stalk pith particles having their natural longitudinal passages extending transversely to the direction of granulation of said corn stalk pith disposed in said body,
   (c) permeable barriers at the ends of said body to hold said granulated particles in filtering relation to gaseous combustion products passing through said body.

5. A pipe filter for use in combination with a pipe comprising:
   (a) a pipe having a bowl and a stem and a filter chamber intermediate the free ends of said bowl and stem defining an air passage extending through said stem to said bowl,
   (b) a filter in said filter chamber, said filter including a continuous outer cover having open ends and granulated corn stalk pith particles having their natural longitudinal passages extending transversely to the direction of granulating of said corn stalk pith disposed within said cover,
   (c) means permeably barricading the said open ends of said cover defining smoke openings whereby smoke is adapted to pass through said openings in said barricading means but said granulated particles are not adapted to pass through said barricading means.

6. A filter element for use in combination with a cigarette comprising:
   (a) a paper cylinder having open ends,
   (b) tobacco in said cylinder extending from one end of said cylinder throughout a major portion of its length,
   (c) said filter element comprising granulated corn stalk pith having their natural longitudinal passages extending transversely to the direction of granulating of said corn stalk pith and said granules extending from said other end toward said tobacco so as to permeably close said other end.

7. A filter element for use in combination with a cigarette comprising:
   (a) a paper cylinder having open ends,
   (b) tobacco in said cylinder throughout a major portion of its length extending from one end,
   (c) a filter element comprising granulated corn stalk pith having their natural longitudinal passages extending transversely to the direction of granulation of said corn stalk, said granulated pith extending from said tobacco to a point adjacent said other end,
   (d) barrier means permeable to smoke adjacent said other end outwardly of said granulated pith whereby said granules are held within said cylinder.

8. The structure of claim 7 and in which said barrier means includes a cap member having at least a central aperture through which smoke is adapted to pass.

References Cited

UNITED STATES PATENTS

| | | | |
|---|---|---|---|
| 127,939 | 6/1872 | Turley et al. | 131—11 |
| 882,913 | 3/1908 | Rowe | 131—208 X |
| 941,019 | 11/1909 | Irving | 131—207 X |
| 972,428 | 10/1910 | Acker | 131—10 |
| 3,079,926 | 3/1963 | Litchfield et al. | 131—10 |
| 3,094,450 | 6/1963 | Davidson | 131—10 X |
| 3,251,365 | 5/1966 | Keith et al. | 131—10 |

SAMUEL KOREN, *Primary Examiner.*

D. J. DONOHUE, *Assistant Examiner.*